United States Patent [19]
Mori et al.

[11] Patent Number: 6,023,114
[45] Date of Patent: Feb. 8, 2000

[54] SPINDLE MOTOR AND ROTATING SHAFT SUPPORTING DEVICE FOR SPINDLE MOTOR

[75] Inventors: Natsuhiko Mori; Kazuo Okamura, both of Mie-ken; Yasuhiro Yamamoto, Kuwana, all of Japan

[73] Assignee: NTN Corporation, Osaka, Japan

[21] Appl. No.: 09/149,437

[22] Filed: Sep. 8, 1998

[30] Foreign Application Priority Data

Sep. 8, 1997 [JP] Japan ................................ 9-242982
Dec. 25, 1997 [JP] Japan ................................ 9-357943

[51] Int. Cl.$^7$ .............................. H02K 5/16; H02K 7/08
[52] U.S. Cl. .................. 310/90; 310/67 R; 310/69 R; 310/90.5; 310/42; 310/44; 360/97.01
[58] Field of Search ................ 310/67 R, 69 R, 310/90, 90.5; 360/97.01; 384/133, 100, 107

[56] References Cited

U.S. PATENT DOCUMENTS

| | | | |
|---|---|---|---|
| 2,800,373 | 7/1957 | Kablick et al. | 308/121 |
| 5,142,174 | 8/1992 | Ide | 310/67 R |
| 5,281,886 | 1/1994 | Ohta | 310/90 |
| 5,488,521 | 1/1996 | Lemke et al. | 360/97.02 |
| 5,541,462 | 7/1996 | Nii et al. | 310/90 |
| 5,559,382 | 9/1996 | Oku et al. | 310/90 |
| 5,678,929 | 10/1997 | Parsoneault et al. | 384/112 |
| 5,746,516 | 5/1998 | Miyasaka et al. | 384/291 |
| 5,762,423 | 6/1998 | Mori et al. | 384/279 |
| 5,770,906 | 6/1998 | Hazelton et al. | 310/90 |
| 5,789,836 | 8/1998 | Hayakawa | 310/90 |
| 5,821,655 | 10/1998 | Tokushima et al. | 310/90 |
| 5,850,317 | 12/1998 | Gregory et al. | 360/37.01 |

FOREIGN PATENT DOCUMENTS

| | | | |
|---|---|---|---|
| 671268 | 4/1952 | United Kingdom | 384/291 |
| 2 064 676 | 6/1981 | United Kingdom | 384/291 |
| 2 316 453 | 2/1998 | United Kingdom | 184/291 |

*Primary Examiner*—Elvin Enad
*Attorney, Agent, or Firm*—Nikaido, Marmelstein, Murray & Oram, LLP

[57] ABSTRACT

Bearing 1 comprises a porous bearing body 1a having a bearing surface 1b disposed to oppose an outer circumferential surface of the rotating shaft 3 via a bearing clearance 4, a lubricating oil or lubricating grease impregnated in the bearing body 1a, and hydrodynamic pressure generating grooves 1c formed on the bearing surface 1b of the bearing body 1a. The rotating shaft 3 is supported, without making contact with the bearing 1, by a hydrodynamic pressure oil film formed in the bearing clearance and the oil is circulated, via openings made in the surface of the bearing body 1a, between the inside of the bearing body 1a and the bearing clearance 4.

23 Claims, 9 Drawing Sheets

SPINDLE MOTOR AND ROTATING SHAFT SUPPORTING DEVICE FOR SPINDLE MOTOR

SPECIFICATION

Spindle motor and rotating shaft supporting device for spindle motor.

BACKGROUND OF THE INVENTION

The present invention relates to a spindle motor and rotating shaft supporting device for a spindle motor equipped in information equipment. Information equipment referred to herein includes information processing devices such as a laser beam printer (LBP), a digital facsimile, a digital duplicating machine (PPC), etc., in addition to information recording equipment using an information recording carrier such as a magnetic disk unit (HDD, FDD), an optical disk unit (CD, DVD), a photomagnetic disk unit (MD, MO, ODD), a digital audio tape recorder (DAT).

The spindle motor of abovementioned information equipment is required, in addition to having high precision of rotation, to be capable of rotating at a high speed, to be low in cost and to lessen noise during operation. One of factors which determines whether these requirements are satisfied or not is a supporting device that supports the spindle of the motor. In the prior art a ball bearing or an oil-impregnated wintered bearing has been used for the supporting device.

Use of the ball bearing, however, results in drawbacks as described below.

Such spindle motors are often operated at high rotational speeds from about 5000 to 12000 rpm, in particular, tens thousands of revolutions per minute in a laser beam printer. A ball bearing generates characteristic racing noise (sound generated by balls rolling on a bearing ring) and other noise due to self-excited vibration of a cage. The noise level increases as the operating speed increases, and attempts to reduce the noise has been limited. Moreover, high rotation accuracy is required in the abovementioned spindle motor to cope with RRO (Repeatable Run Out), NRRO (Non Repeatable Run Out), jitter, etc. There are many components such as an outer ring, inner zing, balls, a cage, seal, grease, etc., in a ball bearing, and there are many factors such as mechanical accuracy, assembling accuracy onto the spindle motor, preloading method, etc., which influence the rotation accuracy, and are complicatedly combined. Therefore, it is difficult to control accuracy. Even though accuracy is controlled, costs are increased.

An oil-impregnated sintered bearing, on the other hand, has such advantages over the ball bearing as generating less operating noise and comprising less component parts resulting in lower cost, but has drawbacks as descried below.

To operate optical disk unit, a user selects a particular disk from among a plurality of disks and sets the selected disk on a turn table. However, since there are variations in the manufacturing accuracy among individual disks, unbalanced load caused when the motor to rotate, results in a RRO of the rotating shaft (disk rotating out of horizontal plane). In the conventional oil-impregnated sintered bearing, loaded region moves in the circumferential direction as the shaft rotates when used under rotation at such a high speed as described above, while the oil film cannot follow the movement thus resulting in the failure of oil film formation. This phenomenon causes increase of the RRO of the rotating shaft (disk rotating out of horizontal plane) and furthermore develops in various drawbacks such as miss-read of the disk.

Also in the oil-impregnated sintered bearing, air is entrained into the bearing during rotation and the amount of entrained air increases as the rotation speed increases, thus hindering the formation of the oil film. When oil film is not formed sufficiently, metal contact takes place thereby accelerating wear. The wear causes the RRO to grow which makes it difficult for the oil film to form, thus falling into a vicious cycle and imposing a problem in terms of durability. Furthermore, unstable vibration such as a whirl occurs if the oil-impregnated sintered bearing is used for BDD, LBP, etc., since it is a type of cylindrical plain journal bearing. In such circumstances, it cannot be achieved accuracy such as NRRO requited in above device.

The present invention aims at solving the problems of the ball bearing a-ad the oil-impregnated sintered bearing described above, and it is an object of the invention to provide a spindle motor and a rotating shaft support device thereof for information equipment.

SUMMARY OF THE INVENTION

1. In order to solve the abovementioned problems, a supporting device for a spindle motor of information equipment, comprising a rotating shaft driven and rotated by an excitation force produced between a rotor and a stator, on which rotating elements of information equipment are attached, and a bearing for rotatably supporting the rotating shaft;

wherein said bearing comprises a porous bearing body having a bearing surface disposed to oppose an outer circumferential surface of the rotating shaft via a bearing clearance, a lubricating oil or lubricating grease impregnated in the bearing body, and hydrodynamic pressure generating grooves formed on the bearing surface of the bearing body in such a configuration as inclined with respect to the axial direction, so that the rotating shaft is supported, without making contact with the bearing, by a hydrodynamic pressure oil film formed in the bearing clearance and the oil is circulated, via openings made in the surface of the bearing body, between the inside of the bearing body and the bearing clearance.

Where it is assumed that the information equipment is a laser beam printer and the rotating element is a polygon mirror, the spindle motor is used as a spindle motor for the polygon mirror, and where it is assumed that the information equipment is a disk unit (magnetic disk unit, optical disk unit, photomagnetic disk unit, etc.), and the rotating element is a turntable for supporting a disk which is an information recording carrier, and the spindle motor is used as a spindle motor for disk drive.

In this type of bearing (oil-impregnated porous bearing), lubricant (lubricating oil or lubricating grease) contained in the bearing body oozes out from the inner circumferential surface of the bearing body (chamfered portion of inner circumference included) and is dragged in the bearing clearance, as the rotating shaft rotates. The oil dragged in the bearing clearance forms a film of lubricating oil which supports the rotating shaft without making contact with the bearing. In the case where a plurality of hydrodynamic pressure generating grooves (having a configuration of, for example, herring bone or spiral) inclined with respect to the axial direction are made in the bearing surface, the hydrodynamic pressure effect of the oil further drags the lubricant taken from the inside of the bearing body into the bearing clearance and continues to pressure the lubricant into the bearing surface, and therefore the oil film pressure is increased and rigidity of the bearing can be improved.

When a positive pressure is generated in the bearing clearance, since the bearing has pores (openings where voids in the porous body system opens to the outer space) in the surface thereof, the lubricant circulates back to the inside of the bearing body but additional lubricant continues to be pressured into the bearing clearance, and therefore the oil film pressure and rigidity are maintained at high levels. Therefore, the high revolution speed accuracy can be achieved and the RRO, NRRO and jitter can be reduced. This bearing also generates less noise because the shaft rotates without making contact with the bearing body, and can be manufactured at a lower cost. Further, unlike a conventional hydrodynamic slide bearing which does not employ a porous material, the oil continues to circulate even when air bubbles are generated in the oil film or dragged therein, and therefore such trouble does not occur as the air bubbles are taken into the bearing body not allowing the bearing function to become unstable.

2. The bearing surface may be provided with a first hydrodynamic pressure generating area in which a plurality of hydrodynamic pressure grooves inclined to one side of the axial direction are arranged in the circumferential direction; a second hydrodynamic pressure generating area, separated from the first hydrodynamic pressure generating area in the axial direction, in which a plurality of hydrodynamic pressure generating grooves inclined to the other side of the axial direction are arranged in the circumferential direction; and a flat portion located between the first and the second hydrodynamic pressure generating area.

With such a structure,
(1) As relative rotations occur between a shaft and the bearing body, because the oil is collected around the flat portion by the hydrodynamic pressure generating grooves formed in the opposing directions in both areas, pressure of the oil film in this portion is increased.
(2) Because there are no hydrodynamic pressure generating grooves in the flat portion, rigidity of the bearing can be made higher compared to a continuous bearing having hydrodynamic pressure generating grooves which are formed continuously in the axial direction, thereby making it possible to further reduce RRO of the rotating shaft.
(3) It is possible to prevent the dynamic pressure being made uneven due to unbalance of the openings.

3. When a plurality of bearing surfaces which are separated from each other in the anal direction are formed on the inner circumference of the bearing body, such problems can be avoided as poor accuracy which causes troubles in a case where plurality of bearings are arranged separately.

4. If the viscosity of a lubricant agent such as lubricating oil or lubricating grease is too high since as described above the polygon mirror motor is used at a high speed, there arise problems, by which an appointed number of revolutions can not be obtained, and heat generation is increased. Therefore, it is necessary to set an optical viscosity. If the dynamic viscosity is set to a greater value than 30cSt at 40° C., the drive at a high speed is hindered. To the contrary, if it is set to a lower value than 5cSt or less, the dynamic viscosity is too small, wherein oil is splashed, and a problem arises in durability. Judging from the above description, the dynamic viscosity of the lubricating oil or base oil of the lubricating grease impregnated in the bearing body at 40° C. is set to a range from 5cSt to 30cSt inclusive.

5. When a lubricating grease is used as the lubricant, apparent viscosity becomes significantly higher than that of lubricating oil in portions other than the bearing clearance where the lubricant receives shearing force, and the grease becomes less likely to flow out. When the concentration of a thickening agent (consistency intensifier) which is mixed and dispersed in the oil is higher than 5 wt %, the grease has excessively high apparent viscosity and becomes difficult to be impregnated in the bearing body, while it becomes troublesome to remove excessive grease sticking onto the space after impregnation. When the concentration of the thickening agent is lower than 0.5 wt %, on the other hand, the effect of using the grease is nearly lost and the amount of grease which flows out is not different from that in a case when the lubricating oil is used. For these reasons, the thickening agent concentration of lubricating grease is set from 0.5 percent by weight to 5 percent by weight inclusive.

6. In order to maintain high accuracy, it is highly recommended that the ratio between the groove depth h of the hydrodynamic pressure generating grooves and the bearing clearance c is set within a range of c/h=0.5 through 4.0.

7. In order to maintain high accuracy, it is highly recommended that the ratio c/r of the bearing clearance c to the radius r of the rotating shaft is within a range of c/r=0.0005 through 0.01.

8. Although a porous oil-impregnated bearing is usually used with no oil supplied, it is unavoidable that oil is gradually consumed and caused to flow out due to splashing or vaporization. In this case, since an oil film forming area is contracted, a worsening of the rotation accuracy such as the RRO results therefrom. In particular, in a motor for the laser beam printer in which the shaft is disposed mainly in a vertical posture, and in which it is rotated at a high speed exceeding 10,000 rpm, oil is liable to flow out by the action of centrifugal force. Therefore it is difficult to maintain lubrication performance such as an oil film forming property.

In a spindle motor for LBP having a polygon mirror, occurrence of an oil shortage is critical in view of maintaining highly accurate revolutions. In particular, if a bearing rotates at a high speed in a case where the bearing body is made single, oil rolls in air in its surrounding and is circulated inside of the bearing. Therefore, air may be dragged into the bearing clearance. In order to prevent air from being dragged in, it is an effective measure to provide a member (oil supplying member) to supplement oil if any empty pore is allowed to exist inside the bearing body.

As such an oil supplementing member, a solid resin lubrication composition, the matrix of which is synthetic resin, having lubricating oil or grease blended o impregnated therein, is considered. The resin lubrication composition is to be obtained by, for example, blending synthetic resin powder with lubricating oil or grease and baking the mixture. If this lubrication composition is disposed on the bearing body (excluding the bearing surface) of a bearing in contact therewith, oil is newly supplied from the resin lubrication composition into the interior of the bearing body by a capillary action even though the oil of the bearing body flows out. Therefore, it is possible to form a satisfactory dynamic pressure oil film between a bearing and a rotating shaft at all times. In addition thereto, an oil supplementing effect similar to the above can be obtained by bringing an oil supplementing member, which is composed of a lubricant resin complex in which the abovementioned resin lubrication composition is composed integral with a felt material, or a felt material impregnated with oil, in contact with the bearing body.

9. An oil leakage preventing member may be disposed at one side or both sides in the axial direction of the bearing body. And an air stream generating groove which generates air streams flowing to the bearing body side in the clearance between the oil leakage preventing member and the rotating shaft in line with relative rotations with the rotating shaft may be arranged on the inner circumferential surface of the oil leakage preventing member.

10. The spindle motor according to the present invention has a rotating shaft with a turn table mounted thereon for supporting an optical disk, a bearing which supports the rotating shaft to be rotatable, a rotor mounted on the rotating shaft or on a rotary member which rotates along with the rotating shaft, and a stator mounted on a stationary member, wherein;

the diameter of the rotating shaft is 3mm or less;

the bearing comprises a bearing body made of a porous sintered metal having a bearing surface opposed to the outer circumferential surface of the rotating shaft via a bearing clearance, a lubricating oil or lubricating grease impregnated in the bearing body and hydrodynamic pressure generating grooves formed in the bearing surface of the bearing body while being inclined with respect to the anal direction, so that the rotating shaft is supported, without making contact with the bearing, by a hydrodynamic pressure oil film of the lubricating oil formed in the bearing clearance and the oil is circulated, via openings made in the surface of the bearing body, between the inside of the bearing body and the bearing clearance.

11. The rotating shaft supporting device for the spindle motor of the optical disk unit according to the invention has a rotating shaft with a turn table mounted thereon for supporting an optical disk and is driven to rotate by an excitation force generated between a rotor and a stator, and a bearing which supports the rotating shaft, wherein;

the diameter of the rotating shaft is 3 mm or less; and the bearing comprises a bearing body made of a sintered porous metal having a bearing surface disposed to oppose the outer circumferential surface of the rotating shaft via a bearing clearance, a lubricating oil or lubricating grease impregnated in the bearing body and hydrodynamic pressure generating grooves formed in the bearing surface of the bearing body in such a configuration as inclined with respect to the axial direction, so that the rotating shaft is supported, without making contact with the bearing, by a hydrodynamic pressure oil film of the lubricating oil formed in the bearing clearance and the oil is circulated, via openings made in the surface of the bearing body, between the inside of the bearing body and the bearing clearance.

When a positive pressure is generated in the bearing clearance, since the bearing has pores (openings) in the surface thereof, the lubricant circulates back to the inside of the bearing body but additional lubricant continues to be pressured into the bearing clearance, and therefore the oil film pressure and rigidity are maintained at high levels. Thus high accuracy of rotation can be achieved, and the RRO of the rotating shaft can be reduced to a level required by modern optical disk unit (10 $\mu$m or less, provided that the unbalanced load is 0.5 g·cm, rotation speed is 8000 rpm and measuring is cared out a position existed at a distance of 10 mm upward from an outer surface of the shaft faced the disk). This bearing also generates less noise because the shaft rotates without making contact with the bearing body, and can be manufactured at a lower cost. Further, unlike a conventional hydrodynamic slide bearing which does not employ a porous material, the bearing function is not expected to become unstable even when air bubbles are generated in the oil film or dragged therein, since the air bubbles are exhausted to the outside from the bearing body in the process of the oil circulation.

12. When the ratio of bearing clearance c to groove depth h of the hydrodynamic pressure generating grooves is set within a range of c/h=0.5 to 2.0, the RRO can be suppressed thereby improving the accuracy of reading the information recorded on a disk.

13. Dynamic viscosity of the lubricating oil or base oil of the lubricating grease impregnated in the bearing body is preferably in a range from 7 cSt to 50 cSt inclusive at a temperature of 40° C.

14. When the void ratio in the surface of the bearing surface is in a range from 2% to 12% inclusive, it is the possible to balance the amount of oil circulating into the inside of the bearing body and the amount of oil oozing out, thereby securing a practically favorable level of oil film pressure (rigidity of bearing).

15. The bearing surface has a first groove area wherein a plurality of hydrodynamic pressure generating grooves inclined to one side of the axial direction are arranged in the circumferential direction, a second groove area which is separated from the first groove area in the axial direction where a plurality of hydrodynamic pressure generating grooves inclined to the other side of the axial direction are arranged in the circumferential direction and a flat portion located between the first groove area and the second groove area. In this configuration, because the oil is collected around the flat portion by the hydrodynamic pressure generating grooves formed in the opposing directions in both areas, pressure of the oil film in this portion is increased. Also because there are no hydrodynamic pressure generating grooves in the flat portion, rigidity of the bearing can be made higher compared to a continuous bearing having hydrodynamic pressure generating grooves which are formed continuously in the axial direction, thereby making it possible to further reduce the RRO of the rotating shaft.

16. When a plurality of bearing surfaces which are separated from each other in the axial direction are formed on the inner circumference of the bearing body, such problems can be avoided as poor accuracy which causes troubles in a case where plurality of bearings are arranged separately.

17. When the bearing body is fixed on the inner circumference of a housing and an air passage opening at both ends of the bearing body in the axial direction is provided between the outer circumference of the bearing body and the inner circumference of the housing, incorporation of assembling the shaft in the bearing is improved.

According to the rotating shaft supporting device of the present invention, as will be clear from the foregoing description, the rotating shaft is supported by the hydrodynamic pressure oil film of the lubricating oil formed in the bearing clearance without making contact with the bearing, while the oil is circulated via the openings in the surface of the bearing body between the inside of the bearing body and the bearing clearance, and therefore operating noise and production cost can be lowered compared to rotating shaft supporting devices which employ ball bearings. In comparison to a case where oil-impregnated sintered bearing without hydrodynamic pressure generating grooves is used, too, rigidity of the bearing can be made higher and the rotation accuracy (RRO, NRRO, jitter, etc.) can be made higher due to the hydrodynamic pressure effect of the hydrodynamic pressure generating grooves, thereby reducing the RRO due to unbalance load of the disk. The bearing surface is always provided with a good oil film formed thereon, thus improving the durability and service life.

According to the spindle motor of the present invention, operating noise and production cost can be lowered, and moreover reading accuracy of optical disks can be improved.

DETAILED DESCRIPTION OF THE PREFERRED EMBODIMENTS

Hereinafter, a description is given of a preferred embodiment of the invention.

Figure 1:
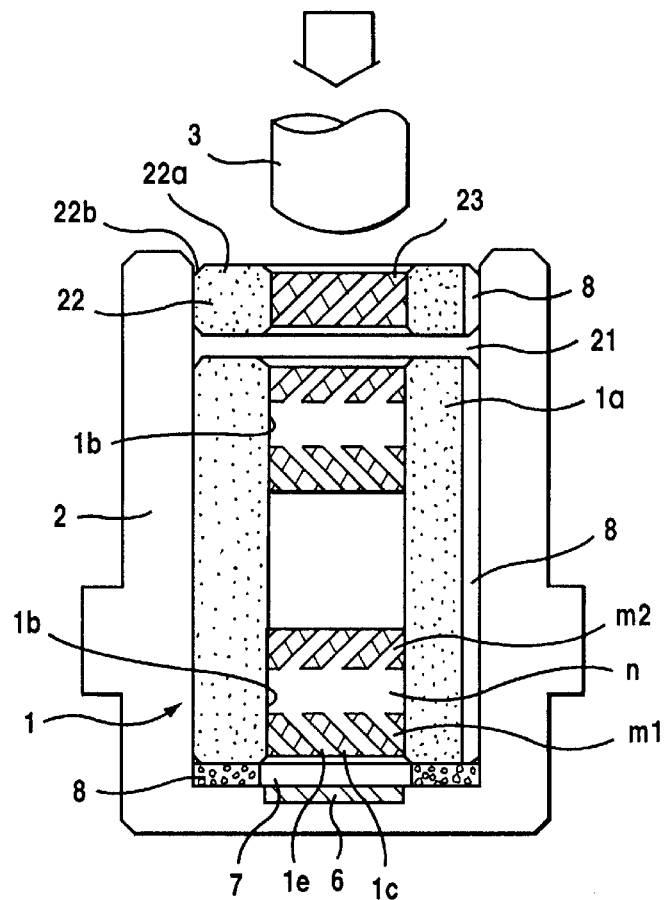
FIG. 1 is an anally sectional view of a preferred embodiment of a bearing device according to the invention.

FIG. 1 shows an example of a rotating shaft supporting device for a spindle motor (for a polygon mirror motor) according to the present invention, wherein a single bearing body $1a$ having two radial bearing surfaces $1b$ in the axial direction is pressure-fitted into a housing 2, one end of which is open and the other end of which is clogged, and a rotating shaft 3 incorporated with a rotor and a polygon mirror inserted into the inner circumferential portion of the bearing body $1a$, thereby causing a porous oil-impregnated bearing 1 to be constituted.

Figure 2:
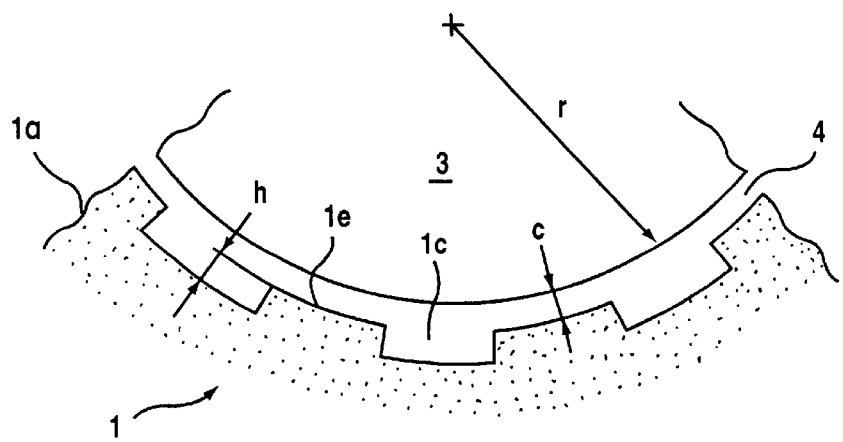
FIG. 2 is a radially sectional view of a hydrodynamic pressure type porous oil-impregnated bearing.
Figure 3:
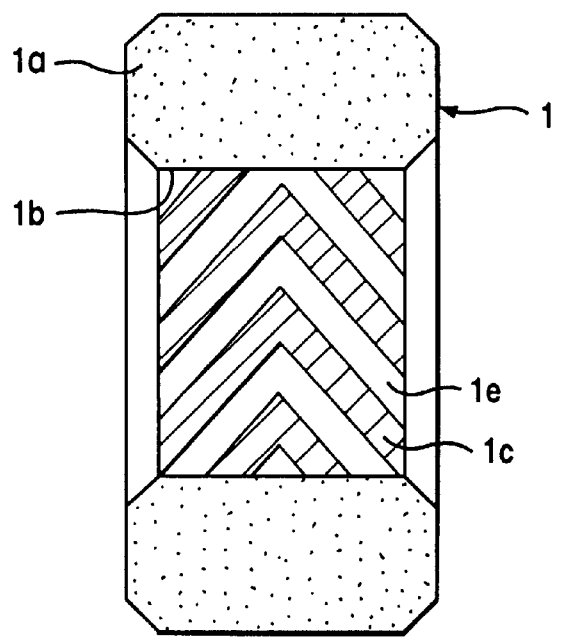
FIG. 3 is an axially sectional view of a porous oil-impregnated bearing having continuous herringbone grooves.

The bearing 1 is fixed inside the housing 2 by either pressure fitting or bonding. The bearing 1 comprises a cylindrical bearing body $1a$ made of a porous sintered metal having a bearing surface $1b$ opposing the outer circumference of the rotating shaft 3 via a bearing clearance 4, as shown in FIG. 2 and FIG. 3, the bearing being impregnated with lubricating oil or lubricating grease. The bearing body $1a$ is made of a sintered metal which includes copper or iron, or both of these as the main component, and preferably contains from 20 to 95 wt % of copper and has density in a range from 6.4 to 7.2 g/cm$^3$. The bearing body may also be made by sintering or foaming molding of such a material as cast iron, synthetic resin or ceramics, besides sintered metal, thereby forming a porous body of cylindrical configuration having numerous fine holes and a thick wall.

Lubricating oil or grease impregnated in the bearing body $1a$ is not specially limited. However, it is highly recommended that poly-α-olefin based, or ester-based synthetic oil (Jestel, polyol ester based synthetic oil), which has a small evaporation ratio, excellent in oxidization stability, and is less foamed when being agitated, is used as a lubricant. Furthermore, it is also highly recommended that, as a thickening agent of the lubricating grease, a lithium based thickening agent which is easy to handle and excellent to be mass-produced or an urea based thickening agent which is excellent to heat resistance is used. The dynamic viscosity of the lubricating oil or the base oil of lubricating grease at 40° C. is set in a range from 5Sct to 30 cST inclusive. In a case where lubricating grease is used, the thickening agent concentration of which is from 0.5 percent by weight to 5 percent by weight inclusive, is selected.

The bearing body $1a$ has two bearing surfaces $1b$ formed on the inner circumference thereof while being separated from each other in the axial direction, and both of the two bearing surfaces $1b$ have a plurality of hydrodynamic pressure generating grooves $1c$ (herring bone type) inclined with respect to the axial direction being formed in the circumferential direction. It suffices that the hydrodynamic pressure generating grooves $1c$ are formed while being inclined with respect to the axial direction, and a configuration other than the herring bone type, for example spiral, may also be used as far as the condition is satisfied.

Each of the two bearing surfaces $1b$ has a first groove area m1 where hydrodynamic pressure generating grooves $1c$ inclined to one side are arranged, a second groove area m2 which is separated from the first groove area m1 in the axial direction and in which hydrodynamic pressure generating grooves $1c$ inclined to the other side are arranged, and a flat portion n located between the two groove areas m1, m2, while the hydrodynamic pressure generating grooves $1c$ of the two groove areas m1, m2 are separated by the flat portion n to become discontinuous. The flat portion n and the ridge $1e$ between the hydrodynamic pressure generating grooves $1c$ have the same levels.

Figure 4:
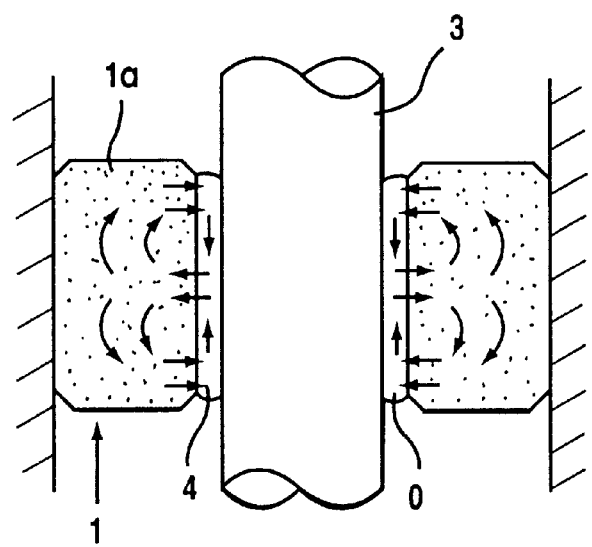
FIG. 4 is an axially sectional view showing oil movements in a porous oil-impregnated bearing having herringbone grooves.

As shown in FIG. 3, if a hydrodynamic pressure generating groove ($1c$:herringbone type hydrodynamic pressure generating grooves is illustrated in the drawing) made of cylindrical oil-impregnated porous material and made continuous to the bore portion of the bearing body $1a$ is provided, the oil stream on the cross section in the axial direction becomes as shown in FIG. 4. That is, oil O oozes from both sides in the axial direction of the bearing body $1a$ in line with revolutions of the shaft 3, and the oozed oil O is pressed into the middle part of the bearing clearance 4 in the axial direction to cause pressure (hydrodynamic pressure) to be produced. With this pressure, the shaft 3 is supported in a non-contacted state.

Figure 5:
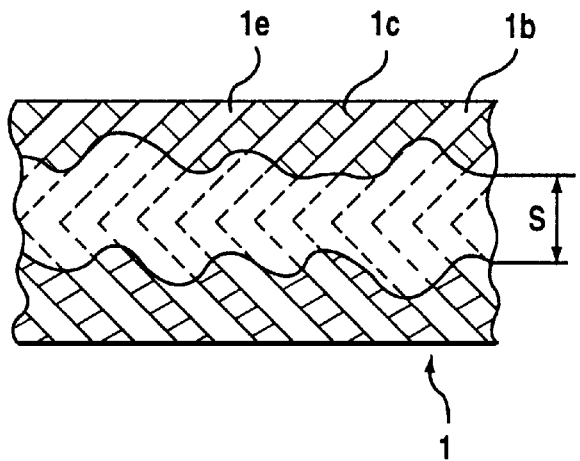
FIG. 5 is a circumferentially developed view of a bearing surface in a porous oil-impregnated bearing illustrated in FIG. 3.

However, if such pressure occurs, oil is circulated from the surface openings to the inside of the bearing. Since generally it is difficult to make the distribution of openings on the bearing surface uniform, large pores and small pores mixedly exist on the bearing surface. The tendency becomes further remarkable if projections and recesses are provided on the bearing surface as in the case where hydrodynamic pressure generating grooves are secured. For example, in a case where there is a large pore on the way of hydrodynamic pressure generating grooves, oil is circulated from the portion to the inside of the bearing. Therefore, the action of dynamic pressure is remarkably decreased. Accordingly, the degree of oil circulation into the interior of the bearing is made uneven at each part. In this case, it is difficult for an oil film to be formed at portions where oil is liable to escape and it is possible for the oil film to be easily formed at portions where oil does not escape. Therefore, as shown in FIG. 5 (showing a developed view of the bearing surface in its circumferential direction), the distribution of an oil film S on the bearing surface 1b is made uneven. In this state, although a certain effect can be brought to suppress unstable vibrations (whirl, etc.) in comparison with a cylindrical plain journal bearing, a sufficient dynamic pressure effect can not be displayed.

Furthermore, although the ridge portion 1e between the hydrodynamic pressure generating grooves 1c becomes a supporting surface to support a shaft, the area of the ridge portion 1e which becomes a supporting surface is made small since the cross section of the bearing surface is convex and concave, and the beading rigidity is lowered.

Figure 6:
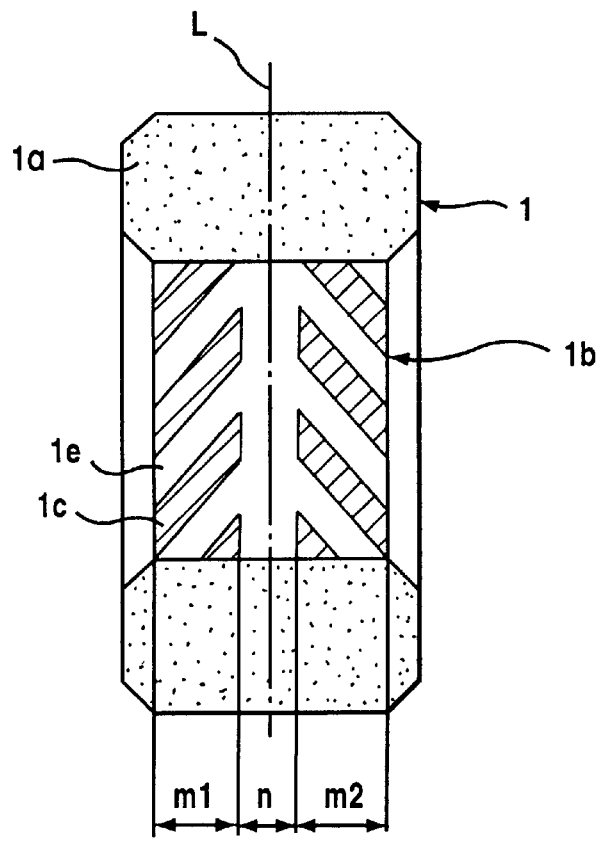
FIG. 6 is an axially sectional view of a porous oil-impregnated bearing having discontinuous herringbone grooves.
Figure 7:
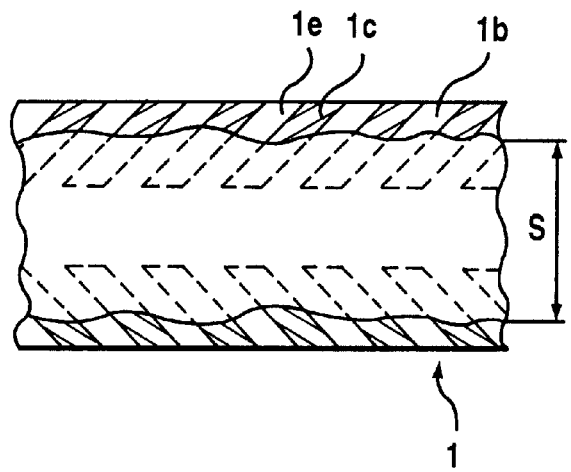
FIG. 7 is a circumferentially developed view of the bearing surface in a porous oil-impregnated bearing illustrated in FIG. 6.

To the contrary, as shown in FIG. 6, if an annular flat portion n is provided between the first and second hydrodynamic pressure generating grooves m1 and m2, it becomes easier to control the degree of opening at the flat portion n. Furthermore, although the oil stream in the groove direction is major in both areas m1 and m2, there exists an oil stream in the circumferential direction at the flat portion n, wherein since oil is supplemented one after another even though a large pore exists, the degree of decreasing the dynamic pressure effect is remarkably less. FIG. 7 shows a developed view of the bearing surface 1b in this case in the circumferential direction. As illustrated in the drawing, the difference between a wide portion and narrow portion of the oil film S is reduced, and the oil film distribution is made uniform. Therefore, a stabilized dynamic pressure effect can be obtained. Still furthermore, since not only the ridge portions 1e between the hydrodynamic pressure generating grooves 1c but also the flat portion n become the supporting surface to support the shaft 3, the area of the supporting surface is expanded, and the rigidity of the bearing can be improved.

In the case of hydrodynamic pressure generating grooves of herring bone configuration in general, it is said that the continuous type has better oil sealing performance because there is no portion in the bearing where negative pressure is generated, thus resulting in no air bubbles being generated. Even with a discontinuous type, however, when the bearing body 1a is made of a porous material as in the present invention, lubricity failure is not expected because the oil is circulated between the bearing clearance 4 and the inside of the bearing and therefore even if air bubbles are generated, the chance of oil being purged by air bubbles from the bearing clearance 4 is restricted.

There may be cases where continuous hydrodynamic pressure generating grooves are preferred depending on the operating conditions, in which case continuous hydrodynamic pressure generating grooves may be used instead of discontinuous hydrodynamic pressure generating grooves.

It is better that the ratio of surface opening (void ratio) of the bearing body 1a is set to a range of from 3 through 20%, preferably 3 through 12%, at the first and second hydrodynamic pressure generating areas m1 and m2, and set to a range from 2 through 12% at the flat portion n. If the ratio of surface opening is less than 3% at both areas, the quantity of supplying oil into the bearing clearance 4 from the interior of the bearing is decreased, wherein there is such a fear that a shortage of oil occurs to cause defective lubrication to occur. To the contrary, if the ratio exceeds 20%, the quantity of oil escaping into the interior of the bearing is increased, no oil is supplied into the flat portion n, wherein there is such a fear that a shortage of oil occurs to cause defective lubrication as well. Furthermore, the ratio of surface opening is less than 2% at the flat portion n, thus production will be made very difficult, resulting in an increase of the production cost. If the ratio exceeds 12%, the quantity of oil escaping into the interior of a bearing is increased, there is such a fear that it results in defective lubrication.

It is better that, where it is assumed that the bearing width is "1", the ratio R of the flat portion n in the bearing width direction is set to a range of from R=0.1 through 0.6, preferably R=0.2 through 0.4. If the ratio is less than 0.1 for the bearing width "1", an effect brought by provision of the flat portion n (that is, increase of the dynamic pressure and increase of the bearing rigidity) does not remarkably appear and the situation is not different from the case of using continuous grooves. Furthermore, if the ratio R is greater than 0.6 for the bearing width "1", the hydrodynamic generating grooves are decreased, a force of pressing oil into the middle portion in the axial direction is weakened, wherein the effect of dynamic pressure is not effectively displayed.

It is better that the ratio of surface opening at the flat portion n is made smaller than the ratio of surface opening at the first and second area m1 and m2, whereby since it becomes difficult for the oil collected at the flat portion n by the hydrodynamic pressure generating grooves to escape from the surface openings to the interior of the bearing, the generating pressure can be increased. Furthermore, the area of the supporting surface to support the shaft can be sufficiently secured, and the bearing rigidity can be also increased.

In a case where two bearings (oil-impregnated porous bearings) are pressure-fit in a housing 2, a problem occurs in view of accuracy of the coaxiality and cylindricality of the two bearings. If accuracy is not satisfactory, the shaft and bearing are brought into linear contact with each other, and in the worst case, there arises a case where the shaft can not pass through the two bearings.

Figure 8:
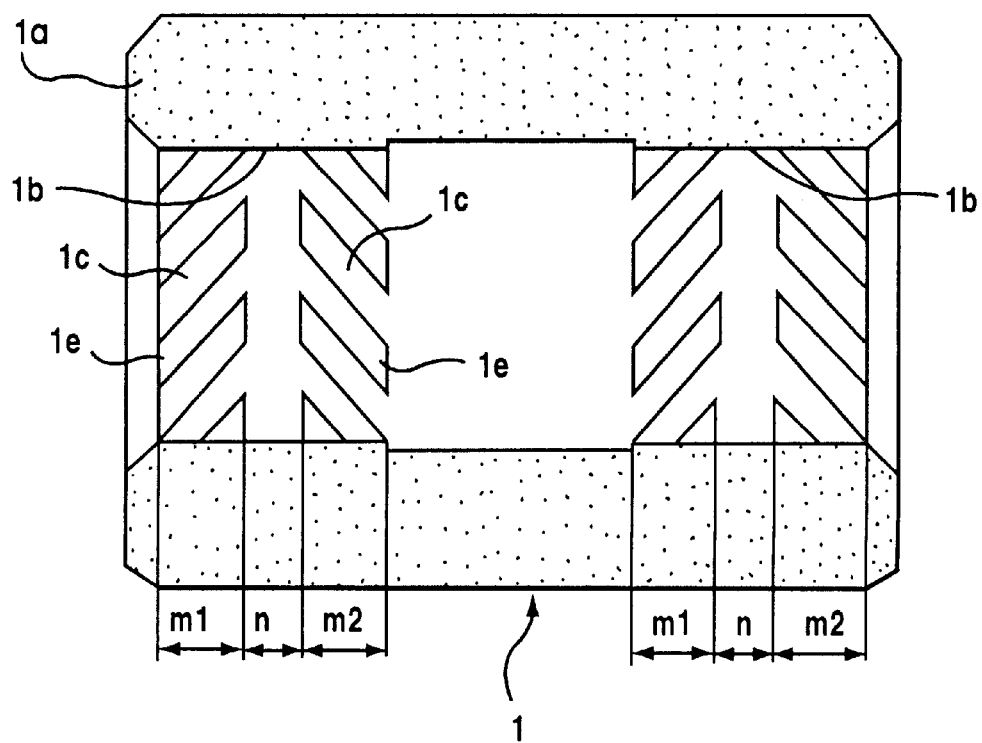
FIG. 8 is an axially sectional view of a porous oil-impregnated bearing according to the invention.

In this case, as shown in FIG. 1 and FIG. 8, it is better that a bearing surface 1b having such a shape as shown in FIG. 6 is provided at two or more points of the bearing body 1a in the axial direction. Since the bearing is such that it has one bearing body 1a and a hydrodynamic pressure bearing surface 1b is provided at a plurality of points (two points in the drawing) on its bore surface, it is possible to prevent the abovementioned problem such as inaccuracy resulting from which a plurality of bearings are separately installed.

Figure 9:
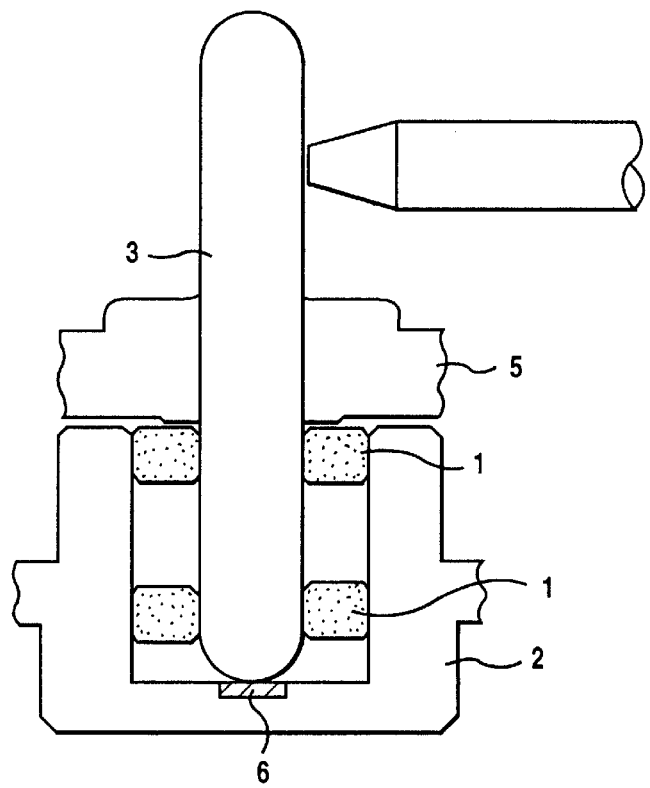
FIG. 9 is an axially sectional view of an evaluation tester in which a real motor of LBP is used.

There is an optimum range for the ratio between groove depth (h: refer to FIG. 2) of the hydrodynamic pressure generating grooves 1c and bearing clearance c (difference between the inner diameter of the bearing body and the outer diameter of the rotating shaft), and a sufficient hydrodynamic pressure effect cannot be expected outside this range. In order to clarify the optimal range, an evaluation test was carried out in order to measure the RRO of the shaft 3 of an actual motor of LBP shown in FIG. 9. During the test, the number of revolutions was 10,000 rpm, and the atmosphere of the test was of normal temperature and normal humidity. In FIG. 9, 2 is the housing, 5 is a rotor, and 6 is a thrust receiver. The rotor 5 is disposed opposite to a stator (not illustrated), and the shaft 3 is rotated by an excitation force generated between the rotor 5 and the stator.

Figure 10:
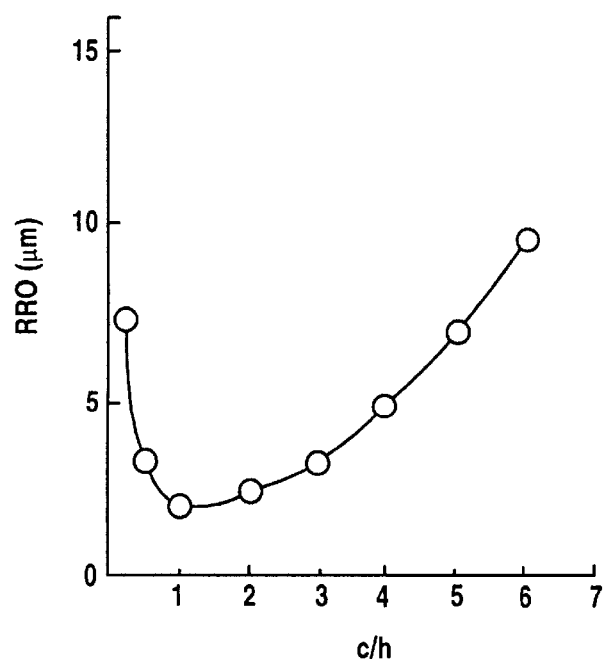
FIG. 10 is a view showing the results of an evaluation test (FIG. 9), which determines the relationship between c/h and RRO.

Under the abovementioned conditions, the values of the RRO with respect to c/h were plotted. The results are shown in FIG. 10. Judging from FIG. 10, if the c/h is in a range from 0.5 through 4.0, although the RRO is 5 µm or less, or if the ratio is less than 0.5 or greater than 4.0, the RRO becomes 5 µm or more. Therefore, in order to maintain high accuracy, it is highly recommended that the ratio between the groove depth h of the hydrodynamic pressure generating grooves and the bearing clearance c is set within a range of c/h=0.5 through 4.0. FIG. 2 gives an exaggerated view of the bearing clearance c and the groove depth h.

Figure 11:
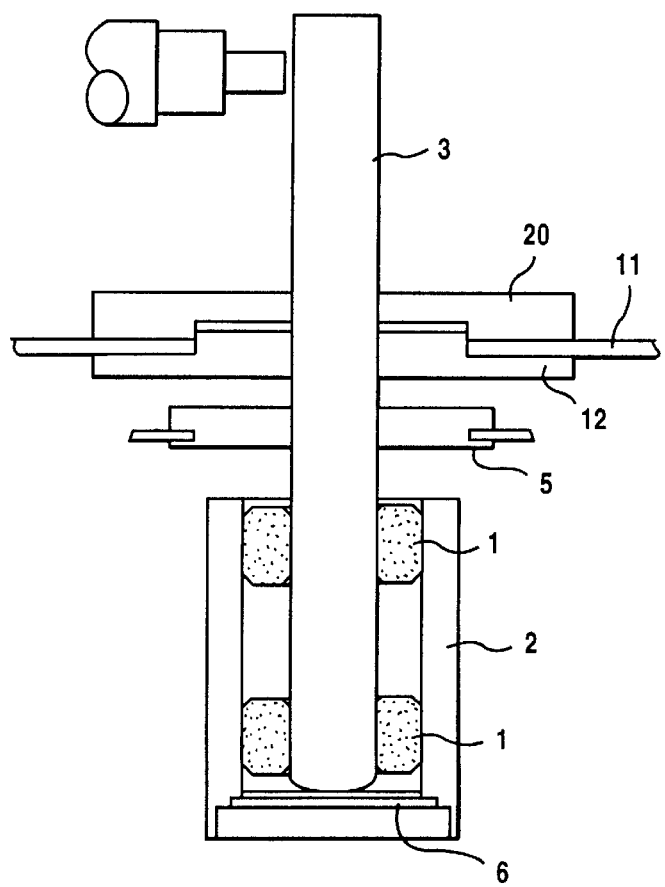
FIG. 11 is an axially sectional view of an evaluation tester in which a real motor of CD-ROM is used.
Figure 12:
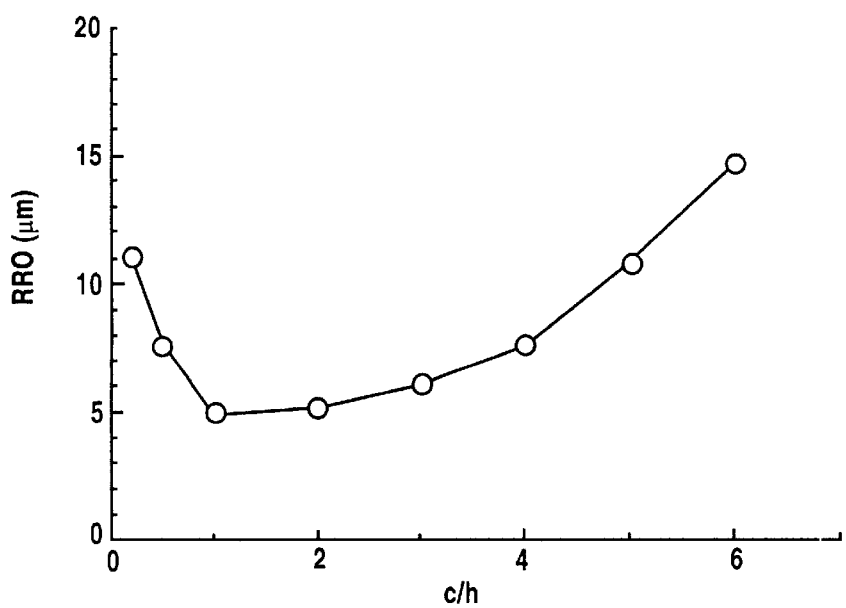
FIG. 12 is a view showing the results of an evaluation test (FIG. 11), which determines the relationship between c/h and RRO.

A test similar to the above was carried out as regards an actual motor of a CD-ROM unit shown in FIG. 11, wherein the number of revolutions was 8,000 rpm, the atmosphere of the test was of normal temperature and normal humidity, and an unbalanced load of 0.5 g·cm was given to the shaft. In FIG. 11, 11 is a disk, 12 is a turntable, and 20 is a clamper. FIG. 12 shows the results of the test. Judging from FIG. 12, if the c/h is in a range from 0.5 through 4.0, the RRO becomes 10 µm or less. However, if the ratio is less than 0.5 or exceeds 4.0, the RRO becomes 10 µm or more. Therefore, in order to maintain high accuracy, it is highly recommended that the ratio c/h is in a range from 0.5 through 4.0 as in the case of LBP.

There is an optimal range with respect to the ratio of the bearing clearance (radius clearance: c) to the radius of the rotating shaft r, wherein it is considered that no sufficient dynamic pressure effect can be obtained outside the range. In order to clarify the optimal range, an evaluation test to measure the RRO of the shaft 3 of the actual motor of LBP shown in FIG. 9 was carried out as in the above. Then, the number of revolutions was 10,000 rpm, and the atmosphere of the test was of normal temperature and normal humidity.

Figure 13:
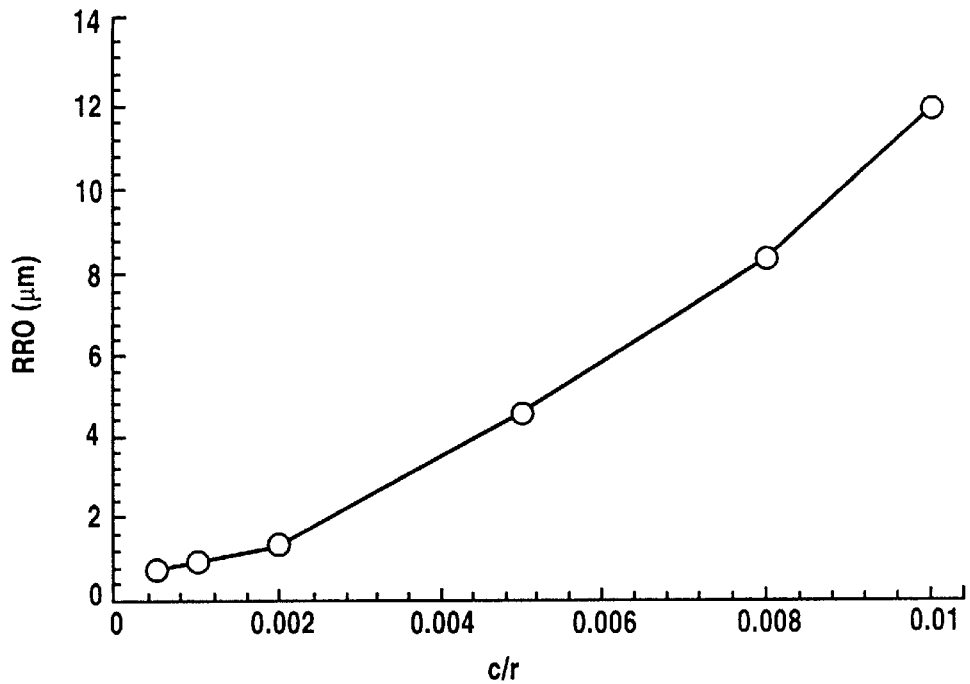
FIG. 13 is a view showing the results of an evaluation test (FIG. 9), which determines the relationship between c/r and RRO.

Under the abovementioned conditions, the values of the RRO with respect to c/r were plotted. The results are as shown in FIG. 13. Judging from FIG. 13, if the c/r is in a range from 0.0005 through 0.01, the RRO is 5 µm or less. However, if the c/r is less than 0.0005, the torque is too high, wherein the speed acceleration can not be increased to an appointed number of revolutions. Furthermore, if the c/r exceeds 0.01, the RRO becomes 5 µm or more. Therefore, in order to maintain high accuracy, it is highly recommended that the ratio c/r of the bearing clearance c to the radius r of the rotating shaft is within a range of c/r=0.0005 through 0.01.

Figure 14:
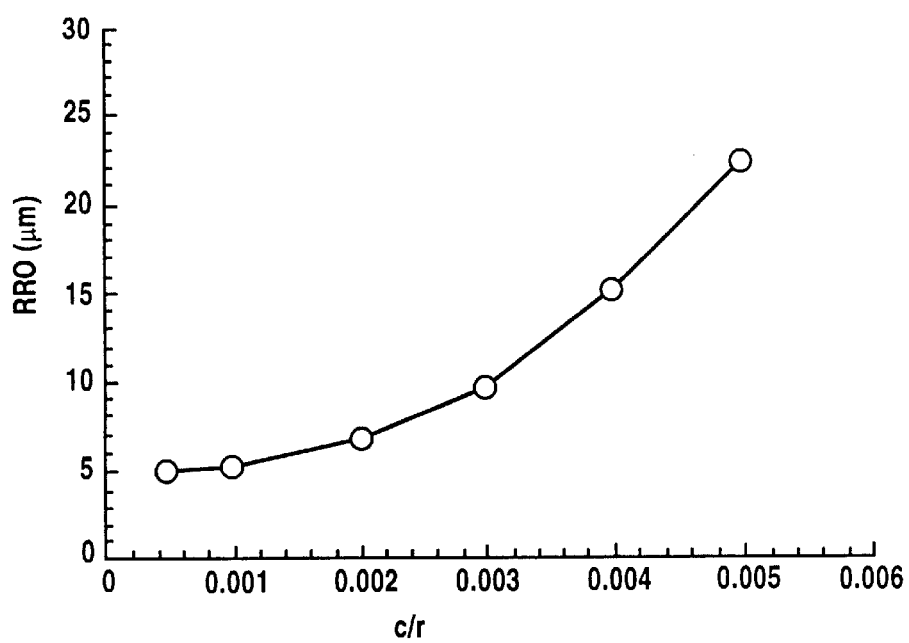
FIG. 14 is a view showing the results of an evaluation test (FIG. 11), which determines the relationship between c/r and RRO.

As regards the actual motor of the CD-ROM unit shown in FIG. 11, a test similar to the above description was carried out, wherein the number of revolutions was 8,000 rpm, the atmosphere of the test was of normal temperature and normal humidity, and an unbalanced load of 0.5 g·cm was given to the shaft. FIG. 14 shows the results of the test. Judging from FIG. 14, if the c/r is in a range from 0.005 through 0.003, the RRO becomes 10 µm or less. However, if the ratio is less than 0.005, the speed acceleration can not reach an appointed number of time of revolutions, and if the ratio exceeds 0.003, the RRO becomes 10 µm or more. Therefore, in order to maintain high accuracy, it is preferable that the ratio of the bearing clearance c to the radius r of the rotating shaft is in a range from c/r=0.0005 through 0.01, and in particular, it is more favorable in a range from c/r=0.0005 through 0.003.

The hydrodynamic pressure generating grooves 1c described above may be formed by, for example, compression molding. Specifically, a pattern of protrusion and depression which corresponds to the configuration of the hydrodynamic pressure generating grooves 1c is formed on the outer circumference of a core rod (sizing pin, for example). A porous material (sintered metal, for example) for making the bearing body 1a is supplied to the outer circumference of the core rod, and the sintered metal is pressured thereby to form the groove shape of the core rod on the inner circumference thereof, thus transferring the shape of the hydrodynamic pressure generating grooves 1c onto the inner circumference. At this time, the ridge 1e and the hydrodynamic pressure generating grooves 1c can be formed at the same time. Once the hydrodynamic pressure generating grooves have been formed, the core rod can be released from the inside of the sintered metal without breaking the hydrodynamic pressure generating grooves 1c, by utilizing spring-back of the sintered metal due to the removal of the compression force.

In this case, high-precision finish of the sizing pin which transfers the hydrodynamic pressure generating grooves 1c results in high accuracy of the bearing, as well. It is not difficult to achieve the required accuracy of the sizing pin, for example roundness within 1 µm and cylindricity within 2 µm.

AS shown in FIG. 1, an oil supplementing member 8 is disposed in a gap 7 between the lower end surface of the bearing body 1a and the upper surface of the thrust plate 6 in contact with the bearing body 1a.

As such the oil supplementing member 8, a solid resin lubrication composition, the matrix of which is synthetic resin, having lubricating oil or grease blended or impregnated therein, is considered. The resin lubrication composition is to be obtained by, for example, blending synthetic resin powder with lubricating oil or grease and baking the mixture. If this lubrication composition is disposed on the bearing body 1a (excluding the bearing surface 1b) of a bearing in contact therewith, oil is newly supplied from the resin lubrication composition into the interior of the bearing body 1a by a capillary action even though the oil of the bearing body 1a flows out. Therefore, it is possible to form a satisfactory dynamic pressure oil film between the bearing 1 and the rotating shaft 3 at all times. It is highly recommended that the resin lubrication composition has such characteristics by which its impregnated oil oozes onto the surface even in a still state at a temperature of at least 20° C. or more.

In detail, the resin lubrication composition is molded in such a manner that polyolefin powder 95 through 1 percent by weight, of ultra macromolecular weight, the average molecular weight of which is $1\times10^6$ through $5\times10^6$, is blended with lubricating oil or lubricating grease 5 through 99 percent by weight. The lubricating oil or base oil of the lubricating grease is the same as retained oil in the bearing body. This mixture is dispersed and retained at a temperature of or exceeding the gelling point of the ultra macromolecular weight polyolefin and at a temperature of or less than the dripping point of grease in a case where the lubricating grease is used, and the mixture is cooled at normal temperature. Thereby, a resin lubrication composition which is produced at low cost, able to be mass-produced, easy to handle, and simple to be incorporated in the bearing body can be provided. The ultra macromolecular weight polyolefin powder is powder consisting of polyethylene, polypropyrene, polybutene, or a copolymer of these substances, or blended powder in which individual powder is mixed.

In addition thereto, an oil supplementing effect similar to the above can be obtained by bringing an oil supplementing member 8, which is composed of a lubricant resin complex in which the abovementioned resin lubrication composition is composed integral with a felt material, or a felt material impregnated with oil, in contact with the bearing body 1a. The abovementioned lubricant resin complex is able to be molded by, for example, blending synthetic resin powder with lubricating oil or lubricating grease, impregnating felt with this mixture and baking the same.

A cylindrical oil leakage preventing member 22 is disposed via a slight gap 21 upward of the bearing body 1a, and the upper end opening of the housing 2 is clogged by the oil leakage preventing member 22. Air stream generating grooves 23 which generates air streams flowing to the bearing body 1a side in the clearance between the oil leakage preventing member 22 and the rotating shaft 3 in line with relative rotations with the rotating shaft 3 is arranged on the inner circumferential surface of the oil leakage preventing member 22. The oil leakage preventing member 22 is, for example, formed to be of cylindricality, the inner diameter of which is equivalent to or slightly greater than the diameter of the bearing body 1a, and air stream generating grooves 23 is, for example, of a plurality of inclination grooves (having a configuration of, for example, herring bone or spiral). The oil leakage preventing member 22 is formed of a porous material and is not impregnated with any oil, etc. The material for molding the oil leakage preventing member 22 are not specially limited. It may be formed to be porous so as to have air vent pores by sintering or foam-molding powdered metal, cast iron, synthetic resin, ceramic., etc.

Figure 15:
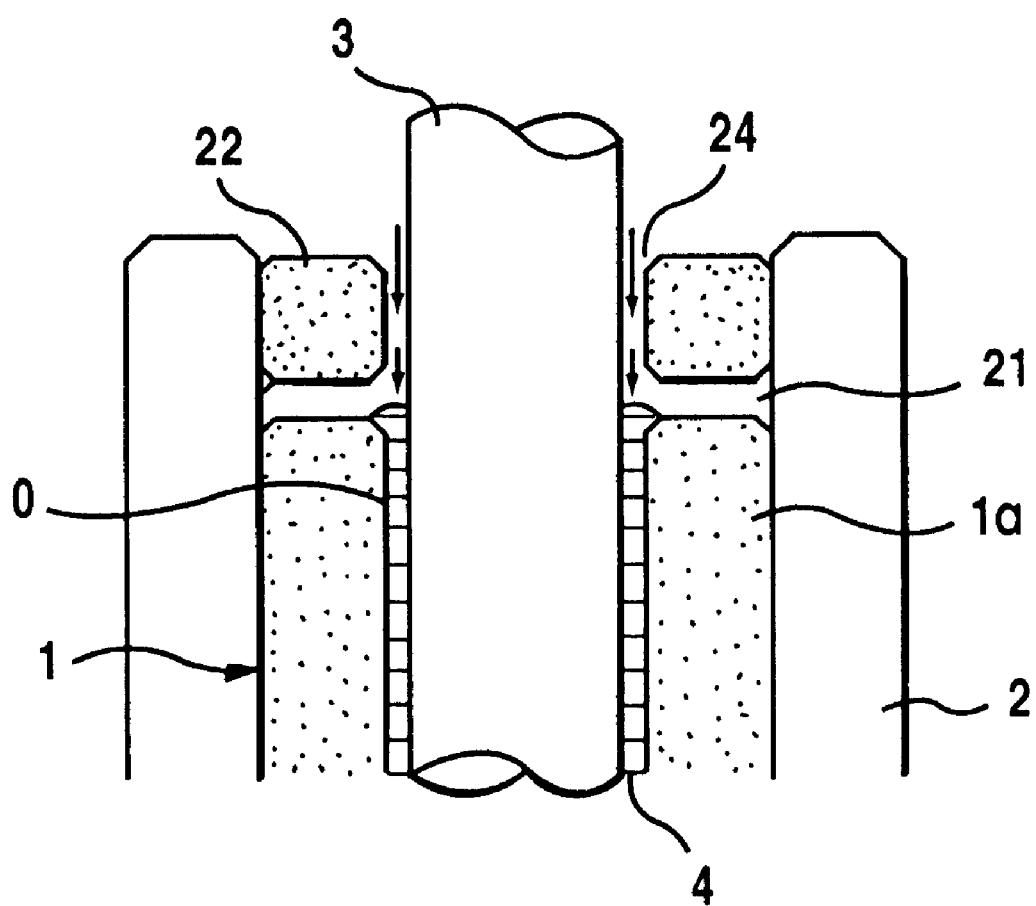
FIG. 15 is an axially sectional view showing oil movements in a porous oil-impregnated bearing having an oil leakage preventing member.

With this construction, as shown in FIG. 15, since an air stream flowing into the direction (downward in the drawing) of the bearing body 1a in line with rotations of the shaft 3 is generated between the rotating shaft 3 and the inner circumferential surface of the oil leakage preventing member 22, oil does not pass into a clearance 24 between the rotating shaft 3 and the oil leakage preventing member 22 even though oil leaks out of the bearing body 1a. By this action, oil leakage can be prevented. Furthermore, in a stationary state, since oil is retained by a capillary action of the clearance 24, oil does not leak even though the rotation stops.

Since the oil leakage preventing member 22 is made porous and a gap 21 is provided between the member 22 and the adjacent bearing body 1a, the leaked oil can be absorbed by the oil leakage preventing member 22 made of porous materials, and furthermore, since, in a stationary state, oil between the oil leakage preventing member 22 and the rotating shaft 3 can be absorbed, portions which are exposed to the atmosphere are reduced, thereby reducing evaporation of oil and generation of dust. The oil absorbed by the oil leakage preventing member 22 is led to the clearance 24 in line with rotations, and is returned to the bearing body 1a side via the gap 24 by air streams produced by an action of air stream generating grooves 23.

Furthermore, the end portion 22a and chamfered portion 22b of the oil leakage preventing member 22, which are opposite to the bearing body 1a are clogged to cause the ratio of surface opening of these parts to be decreased to 5 percent or less in view of the area ratio, and preferably to be completely sealed. In this case, evaporation of the oil absorbed by the oil leakage preventing member 22 and generation of dust can be further decreased.

A space 7 at the bottom of the housing 2 is caused to communicate outside the housing 2 via an air stream path 8. The air stream path 8 functions as an air vent, which is formed by providing an axially notched portion at one part of the outer surface of, for example, the bearing body 1a and the oil leakage preventing member 22. Therefore, the rotating shaft 3 is easily inserted into the bearing 1 when assembling, and a problem by which the inner pressure is increased by heat generation during rotating to cause the rotations to be unstable since the axis (rotor) is pushed upward by thermal expansion of confined air, can be prevented from occurring.

An oil-impregnated porous bearing, it is suited for a rotating shaft supporting device for a spindle motor of optical disk unit will now be described below. The optical disk mentioned here also includes a photomagnetic disk (MD,MO,ODD, etc.).

Figure 16:
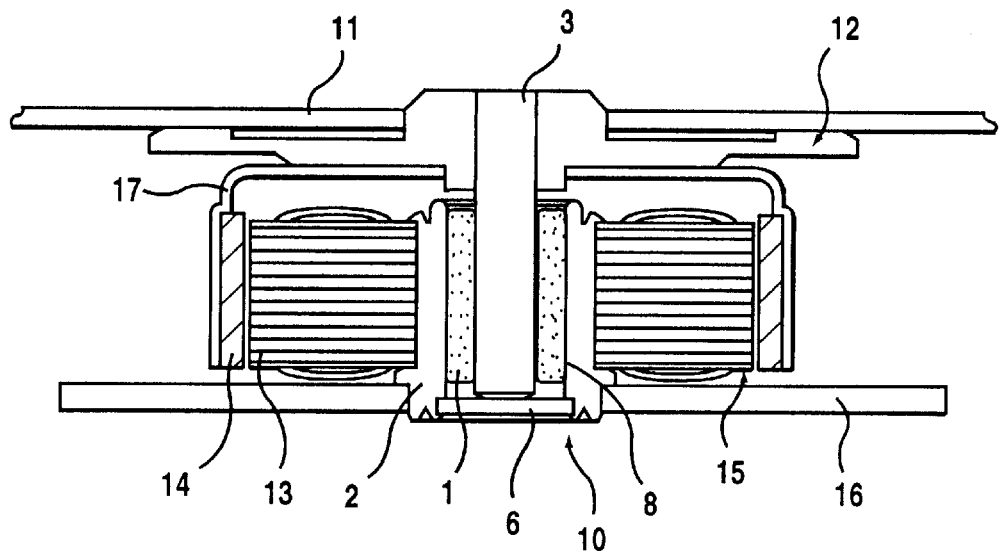
FIG. 16 is a-cross sectional view of a spindle motor installed in optical disk unit.

FIG. 16 is a cross sectional view of a spindle motor installed in a CD-ROM unit. The spindle motor comprises a rotating shaft supporting device 10 having a rotating shaft 3 and a bearing 1 which supports the rotating shaft 3 rotatably, a turn table 12 mounted at the upper end of the rotating shaft for supporting an optical disk 11 (CD-ROM or the like) which serves as an information recording carrier and a motor section 15 consisting mainly of a stator 13 and a rotor 14 which are opposed to each other via a gap in the radial direction. The bearing 1 is fixed onto the inner circumference of a housing 2 (stationary member) which is fixed onto a base 16, while the stator 13 is fixed on the outer circumference of the housing 2. When electric power is supplied to the stator 13, an excitation force generated between the stator 13 and the rotor 14 causes the rotor 14 to rotate which in turn causes the turn table 12 and the disk 11 placed on the turn table 12 and the rotating shaft 3 to rotate with a rotor case 17.

The rotating shaft 3 which constitutes the abovementioned supporting device 10 has a diameter not greater than 3 mm. The diameter of the rotating shaft 3 has no lower limit, but is preferably not less than 1.5 mm for various reasons including rigidity of the shaft and production cost.

Figure 17:
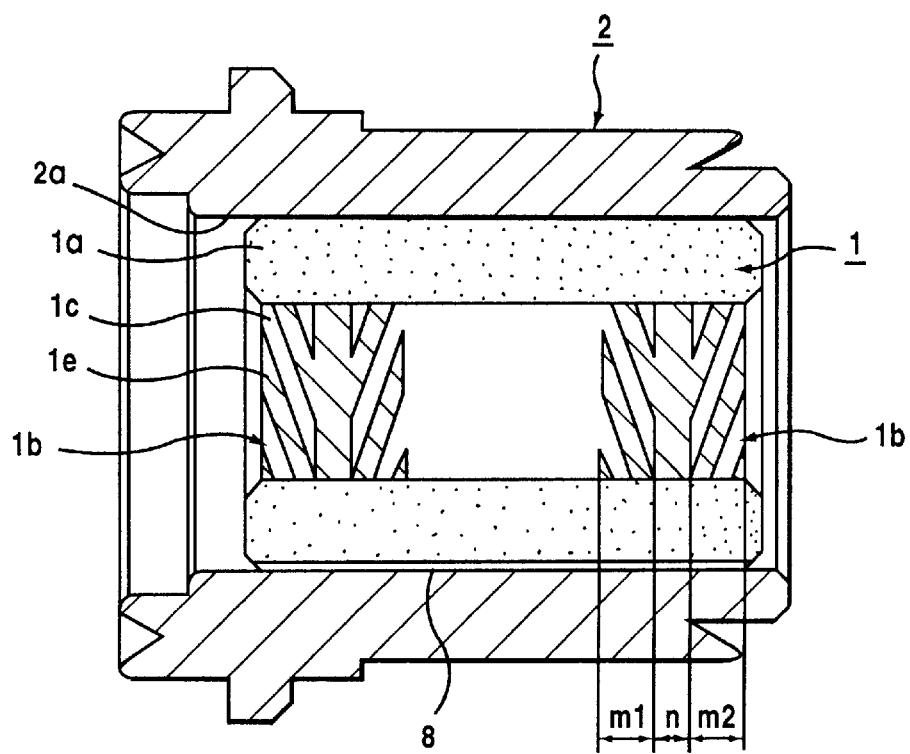
FIG. 17 is a cross sectional view of a rotating shaft supporting device of the spindle motor illustrated in FIG. 16.

As shown in FIG. 17, the bearing 1 is fixed inside the housing 2 by either pressure fitting or bonding. The bearing 1 comprises a cylindrical bearing body 1a made of a porous sintered metal having a bearing surface 1b opposing the outer circumference of the rotating shaft 3 via a bearing clearance 4, as shown in FIG. 2, the bearing being impregnated with lubricating oil or lubricating grease. The bearing body 1a is made of a sintered metal, which includes copper or iron, or both of these as the main component, and preferably contains from 20 to 95 wt % of copper and has density in a range from 6.4 to 7.2 g/cm$^3$. The bearing body may also be made by sintering or foaming molding of such a material as cast iron, synthetic resin or ceramics, besides sintered metal, thereby forming a porous body of cylindrical configuration having numerous fine holes and a thick wall.

The lubricating oil or base oil of the lubricating grease having dynamic viscosity in a range from 7 to 50 cSt at 40° C. is used. When the dynamic viscosity is higher than 50 cSt at 40° C., there arises a problem in high-speed rotation leading to such troubles as lower accuracy in reading information recorded on the disk. When the dynamic viscosity is lower than 7 cSt, conversely, the oil becomes likely to splash thus lowering the durability. When a lubricating grease is used as the lubricant, apparent viscosity becomes significantly higher than that of lubricating oil in portions other than the bearing clearance 4 where the lubricant receives shearing force, and the grease becomes less likely to flow out. When the concentration of a thickening agent which is mixed and dispersed in the oil is higher than 5 wt %, the grease has excessively high apparent viscosity and becomes difficult to be impregnated in the bearing body, while it becomes troublesome to remove excessive grease sticking onto the surface after impregnation. When the concentration of the thickening agent is lower than 0.5 wt %, on the other hand, the effect of using the grease is nearly lost and the amount of grease which flows out is not different from that in a case when the lubricating oil is used. For these reasons, the thickening agent is added to the lubricating grease to a concentration in a range from 0.5 to 5.0 wt %. There is no limitation to the type of the lubricating oil or base oil of the lubricating grease, but those based on poly-α-olefin, ester-based synthetic oil (synthetic oil based on diester or polyol ester) or mixture oil thereof, or fluorinated oil are preferable. As the thickening agent for grease, lithium-based thickening agent which is easy to handle and excellent to be mass-produced or urea based thickening agent which is excellent to heat resistance is preferable.

The bearing body $1a$ has two bearing surfaces $1b$ formed on the inner circumference thereof while being separated from each other in the axial direction, and both of the two bearing surfaces $1b$ have a plurality of hydrodynamic pressure generating grooves $1c$ (herring bone type) inclined with respect to the axial direction being formed in the circumferential direction. It suffices that the hydrodynamic pressure generating grooves $1c$ are formed while being inclined with respect to the axial direction, and a configuration other than the herring bone type, for example spiral, may also be used as far as the condition is satisfied. Inclination angle of the hydrodynamic pressure generating grooves $1c$ may be set arbitrarily, but preferably set in a range from 15 to 40° (more preferably from 15 to 25°) from the direction perpendicular to the axial direction. Width ratio of the hydrodynamic pressure generating grooves $1c$ and a range $1e$ located between two hydrodynamic pressure generating grooves $1c$ is set in a range from 0.8 to 1.6, or preferably in a range from 1.0 to 1.2.

Each of the two bearing surfaces $1b$ has a first groove area m1 where hydrodynamic pressure generating grooves $1e$ inclined to one side are arranged, a second groove area m2 which is separated from the first groove area m1 in the axial direction and in which hydrodynamic pressure generating grooves $1c$ inclined to the other side are arranged, and a flat portion n located between the two groove areas m1, m2, while the hydrodynamic pressure generating grooves $1c$ of the two groove areas m1, m2 are separated by the flat portion n to become discontinuous. The flat portion n and the ridge $1e$ between the hydrodynamic pressure generating grooves $1c$ have the same levels. Such discontinuous hydrodynamic pressure generating grooves $1c$ have such advantages as the oil is collected around the flat portion n resulting in higher oil film pressure and the flat portion n without grooves being provided which results in higher rigidity of the bearing, compared to the case of continuous type where the flat portion n is omitted and V-shaped continuous hydrodynamic pressure generating grooves $1c$ are formed across the groove areas m1, m2.

Where it is assumed that the width of the individual bearing surface $1b$ in the axial direction is "1", the ratio R of the width of the flat portion n in the axial direction to the width of the bearing surface $1b$ in the anal direction is set in a range from R=0.1 to 0.6, and preferably in a range of R=0.2 to 0.4.

There is an optimum range for the ratio between groove depth of the hydrodynamic pressure generating grooves $1c$ (h: refer to FIG. 2) and bearing clearance c (difference between the inner diameter of the bearing body and the outer diameter of the rotating shaft), and a sufficient hydrodynamic pressure effect cannot be expected outside this range. Measurement of the RRO made with an actual motor used in a CD-ROM unit, for the purpose of determining the optimum range, showed that the RRO can be suppressed to a practically tolerable level when the ratio c/h is in a range from 0.5 to 2.0. In this case, it is preferable that the groove depth h be set in a range from 2 to 4 $\mu$m and the bearing clearance c be set in a range from 1.5 to 4 $\mu$m.

The hydrodynamic pressure generating grooves $1c$ described above may be formed by above mentioned compression molding. Prior to sizing of the hydrodynamic pressure generating grooves described above, it is preferable to apply rotation sizing to the inner circumference of the sintered metal thereby to make the openings distributed uniformly over the inner circumference in advance. This is preferably done by controlling the void ratio on the bearing surface $1b$ in a range from 2% to 12% inclusive, preferably around 5%, to be lower than the surface void ratio normally about 20 to 30%) of the conventional oil-impregnated sintered bearing not provided with hydrodynamic pressure generating grooves. This is because a higher surface void ratio makes the oil contained in the bearing clearance 4 likely to infiltrate inside the bearing, thus lowering the hydrodynamic pressure. The surface void ratio can be set, as well as through surface treatment such as rotation sizing described above, setting density of the bearing body $1a$ in advance also by combining the surface treatment and density setting.

The rotating shaft 3 is normally inserted into the bearing 1 while being fitted with the thrust plate 6 which supports the lower end of the rotating shaft 3 onto the housing 2. While air is purged from the bearing clearance 4 between the bearing 1 and the rotating shaft 3 during the insertion, the air maybe dragged in a lower space of the housing 2 because of the small dimension of the bearing clearance 4, which is several micrometers, thus making it difficult to insert the rotating shaft 3. Also rotation of the motor causes heat to be generated, which causes the dragged air to expand that may in turn press the rotating shaft 3 upward leading to instability of the beating performance.

This problem can be solved by providing an air passage 8, as shown in FIG. 17, opening at both ends of the bearing body $1a$ in the anal direction, between the outer circumference of the bearing body $1a$ and the inner circumference $2a$ of the housing 2, so that the air is purged through the air passage 8. The air passage 8 can be formed by making s groove in the axial direction on the outer circumference of the bearing body $1a$, but also may be provided on the inner circumference of the housing 2. The groove can be provided at a plurality of places in the circumferential direction, rather than at one place on the outer circumference of the bearing body $1a$.

We claim:

1. A supporting device for a spindle motor of information equipment, comprising a rotating shaft driven and rotated by an excitation force produced between a rotor and a stator, on which rotating elements of information equipment are attached, and a bearing for rotatably supporting the rotating shaft;

wherein said bearing comprises a porous bearing body having a bearing surface disposed to oppose an outer circumferential surface of the rotating shaft via a bearing clearance, a lubricating oil or lubricating grease is impregnated in the bearing body, and hydrodynamic pressure generating grooves are formed on the bearing surface of the bearing body in such a configuration as to be inclined with respect to the axial direction, so that the rotating shaft is supported, without making contact with the bearing, by a hydrodynamic pressure oil film formed in the bearing clearance and the oil is circulated, via openings made in the surface of the bearing body, between the inside of the bearing body and the bearing clearance, wherein the ratio of bearing clearance c to groove depth h of the hydrodynamic pressure generating grooves is within a range of:

c/h=0.5 through 4.0.

2. The supporting device for the spindle motor of the information equipment as set forth in claim 1, wherein said information equipment is a laser beam printer, and said rotating element is a polygon mirror.

3. The supporting device for the spindle motor of the information equipment as set forth in claim 1, wherein said information device is a disk drive unit, and said rotating element is a turntable for supporting a disk which is an information recording carrier.

4. The supporting device for the spindle motor of the information equipment as set forth in claim 1, wherein the lubricating oil or base oil of the lubricating grease impregnated in the bearing body has dynamic viscosity in a range from 5 cSt to 30 cSt inclusive at a temperature of 40° C.

5. The supporting device for the spindle motor of the information equipment as set forth in claim 1, wherein a thickening agent concentration of said lubricating grease is from 0.5 percent by weight to 5 percent by weight inclusive.

6. The supporting device for the spindle motor of the information equipment as set forth in claim 1, wherein the bearing surface has a first hydrodynamic pressure generating area in which a plurality of hydrodynamic pressure grooves inclined to one side of the axial direction are arranged in the circumferential direction; a second hydrodynamic pressure generating area, separated from the first hydrodynamic pressure generating area in the axial direction, in which a plurality of hydrodynamic pressure generating grooves inclined to the other side of the axial direction are arranged in the circumferential direction; and a flat portion located between the first and the second hydrodynamic pressure generating area.

7. The supporting device for the spindle motor of the information equipment as set forth in claim 1, wherein a plurality of bearing surface are formed, while being separated from each other in the axial direction, on the inner circumferential surface of the bearing body.

8. The supporting device for the spindle motor of the information equipment as set forth in claim 1, wherein ratio of bearing clearance c to radius r of the rotating shaft is within a range of:

c/r=0.0005 through 0.01.

9. The supporting device for the spindle motor of the information equipment, wherein an oil supplementing member composed of any one of a resin lubrication composition made of synthetic resin as its base material, which is blended with or impregnated with lubricating oil or lubricating grease; a lubricant resin complex in which said resin lubrication composition is integrally combined with a felt material; or a felt material impregnated with oil; is brought into contact with the bearing body as set forth in claim 1.

10. The supporting device for the spindle motor of the information equipment as set forth in claim 9, wherein an oil leakage preventing member is disposed at one side or both sides in the axial direction of the bearing body, and an air stream generating groove which generates air streams flowing to the bearing body side in the clearance between the oil leakage preventing member and said rotating shaft in line with rotations of the rotating shaft is arranged on the inner circumferential surface of said oil leakage preventing member.

11. The supporting device for the spindle motor of the information equipment, wherein an oil leakage preventing member is disposed at one side or both sides in the axial direction of the bearing body described in claim 1, an air stream generating groove which generates air streams flowing to the bearing body side in the clearance between the oil leakage preventing member and said rotating shaft in line with rotations of the rotating shaft is arranged on the inner circumferential surface of said oil leakage preventing member.

12. A spindle motor for optical disk unit having a rotating shaft with a turn table mounted thereon for supporting an optical disk, a bearing which supports the rotating shaft, a rotor mounted on the rotating shaft or on a rotary member which rotates along with the rotating shaft, and a stator mounted on a stationary member, wherein a diameter of said rotating shaft is 3 mm or less; and said bearing comprises a bearing body made of a porous sintered metal having a bearing surface disposed to oppose an outer circumferential surface of the rotating shaft via a bearing clearance, a lubricating oil or lubricating grease is impregnated in the bearing body and hydrodynamic pressure generating grooves are formed on the bearing surface of the bearing body in such a configuration as to be inclined with respect to the axial direction, so that the rotating shaft is supported, without making contact with the bearing, by a hydrodynamic pressure oil film formed in the bearing clearance and the oil is circulated, via openings made in the surface of the bearing body, between the inside of the bearing body the bearing clearance, wherein a ratio of bearing clearance c to groove depth h of the hydrodynamic pressure generating grooves is within a range of:

c/h=0.5 through 2.0.

13. The spindle motor for the optical disk unit as set forth in claim 12 wherein the lubricating oil or base oil of the lubricating grease impregnated in the bearing body has dynamic viscosity in a range from 7 cSt to 50 cSt inclusive at a temperature of 40° C.

14. The spindle motor for the optical disk unit as set forth in claim 12 wherein a void ratio in the bearing surface is in a range from 2% to 12% inclusive.

15. The spindle motor for the optical disk unit as set forth in claim 12 wherein the bearing surface has a first groove area where a plurality of hydrodynamic pressure generating grooves inclined to one side of the axial direction are arranged in the circumferential direction, a second groove area separated from the first groove area in the axial direction where a plurality of hydrodynamic pressure generating grooves inclined to the other side of the axial direction are arranged in the circumferential direction and a flat portion located between the first groove area and the second groove area.

16. The spindle motor for the optical disk unit as set forth in claim 12 wherein a plurality of bearing surfaces are formed, while being separated from each other in the axial direction, on the inner circumferential surface of the bearing body.

17. The spindle motor for the optical disk unit as set forth in claim 12 wherein the bearing body is fixed on the inner circumference of a housing and an air passage opening at both ends of the bearing body in the axial direction is provided between the outer circumference of the bearing body and the inner circumference of the housing.

18. A rotating shaft supporting device for a spindle motor of optical disk unit having a rotating shaft, which has a turn table mounted thereon for supporting an optical disk and is driven to rotate by an excitation force generated between a rotor and a stator, and a bearing which supports the rotating shaft to be rotatable, wherein a diameter of said rotating shaft is 3 mm or less; and said bearing comprises a bearing body made of a porous sintered metal having a bearing surface opposed to the outer circumferential surface of the rotating shaft via a bearing clearance, a lubricating oil or lubricating grease is impregnated in the bearing body and hydrodynamic pressure generating grooves are formed in the bearing surface of the bearing body in such a configuration as to be inclined with respect to the axial direction, so that the rotating shaft is supported, without making contact with the bearing, by a hydrodynamic pressure oil film formed in the bearing clearance and the oil is circulated, via openings made in the surface of the bearing body, between the inside of the bearing body and the bearing clearance, wherein a ratio of bearing clearance c to groove depth h of the hydrodynamic pressure generating grooves is within a range of:

c/h=0.5 through 2.0.

19. The rotating shaft supporting device for the spindle motor of the optical disk unit as set forth in claim 18 wherein the lubricating oil or base oil of the lubricating grease impregnated in the bearing body has dynamic viscosity in a range from 7 cSt to 50 cSt inclusive at a temperature of 40° C.

20. The rotating shaft supporting device for the spindle motor of the optical disk unit as set forth in claim 18 wherein a void ratio in the bearing surface is in a range from 2% to 12% inclusive.

21. The rotating shaft supporting device for the spindle motor of the optical disk unit as set forth in claim 18 wherein the bearing surface has a first groove area where a plurality of hydrodynamic pressure generating grooves inclined to one side with respect to the axial direction are arranged in the circumferential direction, a second groove area which is separated from the fist groove area in the axial direction where a plurality of hydrodynamic pressure generating grooves inclined to the other side of the axial direction are arranged in the circumferential direction and a flat portion located between the first groove area and the second groove area.

22. The rotating shaft supporting device for the spindle motor of the optical disk unit as set forth in claim 18 wherein a plurality of bearing surface are formed, while being separated from each other in the axial direction, on the inner circumferential surface of the bearing body.

23. The rotating shaft supporting device for the spindle motor of the optical disk unit as set forth in claim 18 wherein the bearing body is fixed on the inner circumference of a housing and an air passage opening at both ends of the bearing body in the axial direction is provided between the outer circumference of the bearing body and the inner circumference of the housing.

* * * * *